United States Patent [19]
Rzeszewski

[11] Patent Number: 5,374,964
[45] Date of Patent: Dec. 20, 1994

[54] CIRCUIT AND METHOD FOR CONTROLLING ABNORMALLY SLOW TRANSITIONS IN COLOR TELEVISION SIGNALS

[75] Inventor: Theodore S. Rzeszewski, Lombard, Ill.

[73] Assignee: Matsushita Electric Corporation of America, Secaucus, N.J.

[21] Appl. No.: 101,681

[22] Filed: Aug. 4, 1993

[51] Int. Cl.$^5$ .............................. H04N 5/208
[52] U.S. Cl. .............................. 348/62.5; 348/630
[58] Field of Search ............... 358/40, 37, 166, 162; 348/625, 627, 630; H04N 9/64, 5/14, 5/208

[56] References Cited

U.S. PATENT DOCUMENTS

| | | | |
|---|---|---|---|
| 4,030,121 | 6/1977 | Faroudja | 358/37 |
| 4,181,917 | 1/1980 | Richman | 358/36 |
| 4,183,051 | 1/1980 | Richman | 358/36 |
| 4,245,239 | 1/1981 | Richman | 358/38 |
| 4,296,433 | 10/1981 | Rzeszewski | 358/37 |
| 4,316,215 | 2/1982 | Yasumoto et al. | 358/37 |
| 4,414,564 | 11/1983 | Hitchcock | 358/37 |
| 4,729,014 | 3/1988 | Flamm et al. | 358/37 |
| 4,912,551 | 3/1990 | Ozaki | 358/37 |
| 4,935,806 | 6/1990 | Rabii | 358/37 |
| 4,979,025 | 12/1990 | Ichinoi | 358/40 |
| 4,979,228 | 12/1990 | Rzeszewski | 382/54 |
| 4,985,754 | 1/1991 | Levan | 358/23 |
| 5,077,603 | 12/1991 | Macovski | 358/37 |
| 5,124,786 | 6/1992 | Nikoh | 358/37 |
| 5,146,319 | 9/1992 | Engel et al. | 358/39 |
| 5,196,736 | 3/1993 | Doorhein et al. | 358/166 X |

OTHER PUBLICATIONS

IEEE Transactions on Consumer Electronics, vol. CE-31, No. 3, Aug. 1985 "Picture Signal Improvement in Colour TV Receivers".

NETEC-6/3 "Video Transmission Equipment for Teleconference" H. Kaneko et al., Feb. 26–Mar. 2, 1979 (this date reflects a handwritten note on face of document).

SMPTE Journal, Mar. 1993 "Correction of Reproduced Color Errors Due to Bandwith Limitation of the Color-Difference Signals" by J. Kumada et al.

"A Continuous Presence Video Conferencing System", E. F. Brown et al. dated Dec. 3–6, 1975 (this date reflects a handwritten note on face of document).

Primary Examiner—James J. Groody
Assistant Examiner—John W. Miller
Attorney, Agent, or Firm—Willian Brinks Hofer Gilson & Lione

[57] ABSTRACT

A circuit and method for shortening the transition time of sharp color transitions in color television signals. The invention includes a pattern recognition circuit and method which directly and efficiently recognizes color transitions within a predetermined range. The disclosed embodiment of the invention utilizes a filter to output its step response to the pattern recognition circuit which outputs a control signal whenever the color signal rise or fall time does not fit a predetermined pattern. When the pattern recognition circuit recognizes the step response, it directs a hold circuit to output a previous color signal for a predetermined time period before allowing the transition to proceed, thus shortening the transition time.

49 Claims, 4 Drawing Sheets

CIRCUIT AND METHOD FOR CONTROLLING ABNORMALLY SLOW TRANSITIONS IN COLOR TELEVISION SIGNALS

FIELD OF THE INVENTION

This invention relates in general to color transitions in color television signals. More particularly, it relates to a circuit and method for controlling abnormally slow color transitions.

BACKGROUND OF THE INVENTION

A color television camera generates red (R), green (G), and blue (B) color signals, each having the full visual-signal bandwidth (about 4.2 MHz). These signals are not usually transmitted directly to the television receiver. Instead, a matrix circuit converts the original signal components into a luminance signal (Y) and two chrominance signals (R-Y, B-Y). Part of the reason these signals are used is to make color television signals compatible with monochrome receivers which are capable of responding only to "black and white" luminance signals.

The luminance signal includes the full visual-signal bandwidth and defines the image's brightness (white or gray levels). The chrominance (chroma) signals define the image's color hues (tint) and saturation (intensity) levels. It should be noted here that the terms chrominance or color may be used interchangeably to refer both baseband and modulated signals.

The chrominance signals do not have to include full visual-signal bandwidth. In fact, the bandwidths of the two chrominance signals can be reduced to about 1.6 and 0.6 MHz, respectively, by low-pass filters. Initially, it was hoped that any negative effects from the reduced chrominance bandwidth would be indistinguishable to the human eye.

It has turned out, however, that the smaller bandwidth limitation imposed on the two chrominance signals results in perceptible distortion of the color transitions (i.e., chroma transients) that are produced in the resultant color television display. In general, transient distortion results from a slower rise or fall time associated with chroma transients because of the narrower chroma bandwidths. When the transients are between regions of saturation colors, the distortions can be severe, and the effects can be observed in normal broadcasts.

There have been numerous attempts to improve transient distortion in television signals, examples of which are found in U.S Pat. Nos. 4,030,121; 4,181,917; 4,183,051; 4,245,239; 4,296,433; 4,316,215; 4,414,564; 4,729,014; 4,935,806; 4,979,228; 5,077,603; 5,124,786; and 5,146,319. The full disclosure of each of the above patents is incorporated herein by reference.

Many of the known approaches to controlling transient distortion concentrate on analog solutions, for example U.S Pat. Nos. 4,030,121; 4,181,917; 4,183,051; 4,245,239; 4,296,433; 4,316,215; 5,077,603; and 5,124,786. Although some of these techniques have made considerable advances, most analog circuitry in this area has proven to be rather complicated, costly to implement, and difficult to control.

U.S. Pat. No. 5,146,319 to Engel, U.S. Pat. No. 4,935,806 to Rabii, and U.S. Pat. No. 4,414,564 to Hitchcock are directed toward improvements in a standard signal processing technique known as peaking or aperture correction. Peaking is typically applied to luminance signals and involves generating a processed high frequency version of the original signal and adding this high frequency version back to the original signal to get an enhanced signal. As shown in FIGS. 3 and 4 of Hitchcock, the problems associated with standard peaking techniques include excessive preshoot and overshoot (FIG. 3) and an emphasis on the high frequencies (FIG. 4) which can result in a noisy picture.

Rabii discloses a digital peaking method for processing chrominance signals and reducing noise. Rabii uses threshold decision circuitry and a digital comb filter structure to perform both transient improvement and noise reduction. Enhancement signals are calculated and output from a summation block 32 shown in FIG. 1. This enhancement output has the same basic form as the signal from a standard digital 2H comb filter that is commonly used for luminance enhancement, however, Rabii adds a limiter 54 to regulate the amount of preshoot and overshoot that is produced.

The enhancement equations required by peaking techniques are rather complicated, and accordingly, peaking techniques can be costly to implement. Also, the use of threshold decision circuitry makes it virtually impossible to respond to small amplitude chroma transients.

Additionally, preshoot and overshoot represent particularly difficult problems for chrominance signals because the lower frequency response of chroma causes any preshoots and overshoots to be even wider than with luminance. Accordingly, chrominance peaking is incorporated as a correction technique either very moderately or not at all in most television receivers.

U.S. Pat. No. 4,979,228 to Rzeszewski discloses a digital subsystem for improving resolution by inserting additional digital samples into a digital television signal. The Rzeszewski disclosure is directed primarily toward luminance signals, and the additional digital samples are calculated and added according to rather specific and relatively complicated algorithms and circuitry.

U.S. Pat. No. 4,729,014 to Flamm discloses a digital circuit for correcting poor chroma transients. Flamm uses a complicated slope detection technique that responds to digital chrominance signals that exceeds an amplitude threshold and are less than a time threshold . Flamm applies correction to the chrominance signals through a complicated switch arrangement that switches between an unmodified signal (FIGS. 1 and 2) and at least one other signal that has been modified by repeating previous sample values using a common digital video signal processing technique.

Aside from being complicated and costly to implement, Flamm also suffers from the inability to respond to small color transients (FIG. 4b). Additionally, the complicated decision circuitry and switching arrangement increases the risk that the switch will be set incorrectly (FIG. 3).

The present invention overcomes the problems associated with known methods of correcting abnormally slow chroma transients. In particular, the present invention provides the advantages of simplicity, cost effectiveness, and economy in a digital circuit and method for providing direct positive control over the rise and fall times of chroma transients. The present invention provides the further advantages of reliability, efficiency, versatility, and effectiveness for both high and low level color signals.

SUMMARY OF THE INVENTION

Thus, it is an object of the present invention to improve the color transitions displayed in color television receivers.

It is another object of the present invention to improve the rise time of sharp color transitions in color television signals.

It is another object of the present invention to improve the fall time of sharp color transitions in color television signals.

It is another object of the present invention to provide a simple, cost effective, and economical digital circuit and method for correcting abnormally slow chroma transients in color television signals.

It is another object of the present invention to provide a digital circuit and method for providing direct positive control over the rise and fall times of chroma transients in color television signals.

These and other objects are realized in accordance with the present invention by providing a circuit and method for controlling transitions in chrominance signals received by a color television receiver. The circuit includes a first circuit for receiving a digital chrominance signal and generating a first control signal in response to a first predetermined transition in the digital chrominance signal. The circuit further includes a pattern recognition circuit coupled to the first circuit for receiving and recognizing the first control signal and outputting a second control signal to a hold circuit. The second control signal causes the hold circuit to generate a second predetermined transition.

In a preferred embodiment, the first circuit includes a filter circuit, the first control signal includes a step response of the filter, and the first predetermined transition includes a transition time that exceeds a response time that corresponds to a bandwidth of the filter.

In a further embodiment, the pattern recognition circuit recognizes the first control signal by dividing the control signal into sample points and comparing the sample points. The sample points preferably comprise at least A, B, F, and G, and the comparison is accomplished by comparing B to A, F to B, and G to F. The pattern recognition circuit recognizes the first control signal when A is approximately equal to B, and F is greater than B, and G is approximately equal to F. The pattern recognition circuit also recognizes the first control signal when A is approximately equal to B, and F is less than B, and G is approximately equal to F.

In an even further embodiment, the hold circuit comprises a delay circuit coupled to the first circuit, and a flip flop circuit coupled to the delay circuit and the pattern recognition circuit. The second control signal temporarily disables the flip flop circuit, thereby holding an output of the flip flop circuit for a predetermined time. The output of the flip flop circuit is preferably a prior chrominance signal. This delays the color transition, thereby decreasing transition time and steepening the transition.

Another aspect of the present invention is a method of controlling transitions in chrominance signals received by a color television receiver. The steps include generating a first control signal in response to a first predetermined transition in a digital chrominance signal, recognizing the first control signal, generating a second control signal in response to the first control signal, and generating a second predetermined transition in response to the second control signal.

In a preferred embodiment of the method, a filter circuit generates the first control signal, and the first predetermined transition includes a transition time that exceeds a response time corresponding to a bandwidth of the filter.

In a further preferred embodiment of the method, a pattern recognition circuit recognizes the first control signal by dividing the first control signal into sample points and comparing the sample points. The sample points preferably include at least A, B, F, and G, and the sample comparison involves comparing B to A, F to B, and G to F. The pattern recognition circuit recognizes the first control signal when A is approximately equal to B, and F is greater than B, and G is approximately equal to F. The pattern recognition circuit also recognizes the first control signal when A is approximately equal to B, and F is less than B, and G is approximately equal to F.

In another preferred embodiment of the method, the second predetermined transition is generated by delaying the transition time of the original digital chrominance signal, thereby decreasing transition time and steepening the transition.

Accordingly, the present invention achieves several advantages. In particular, the circuit and method of the present invention provides a chroma transient correction scheme that is reliable, efficient, versatile, and effective on both high and low level color signals. Additionally, the present invention provides a simple, easily implemented, cost effective, and economical digital circuit and method for providing direct positive control over the rise and fall time of chroma transients.

DETAILED DESCRIPTION OF THE PRESENTLY PREFERRED EMBODIMENTS

NTSC (National Television System Committee) composite television transmission signals are formed by frequency multiplexing the three components needed to make color television signals into the bandwidth and format that was originally used to transmit monochrome television signals. The transmission signal is transformed (matrixed) from a red (R), green (G), and blue (B) signal format to a format that uses a luminance signal and two chrominance signals. The two chrominance signals are bandwidth limited to a smaller bandwidth than the luminance signal.

The smaller bandwidth imposed upon the two chrominance signals results in unwanted distortion at the luminance and color transitions (transients) in the image. These distortions can be severe when the transitions occur between regions of saturation colors. In general, such distortions result from abnormally slow rise or fall times associated with chrominance signals because of the narrower chrominance bandwidths.

Figure 1:
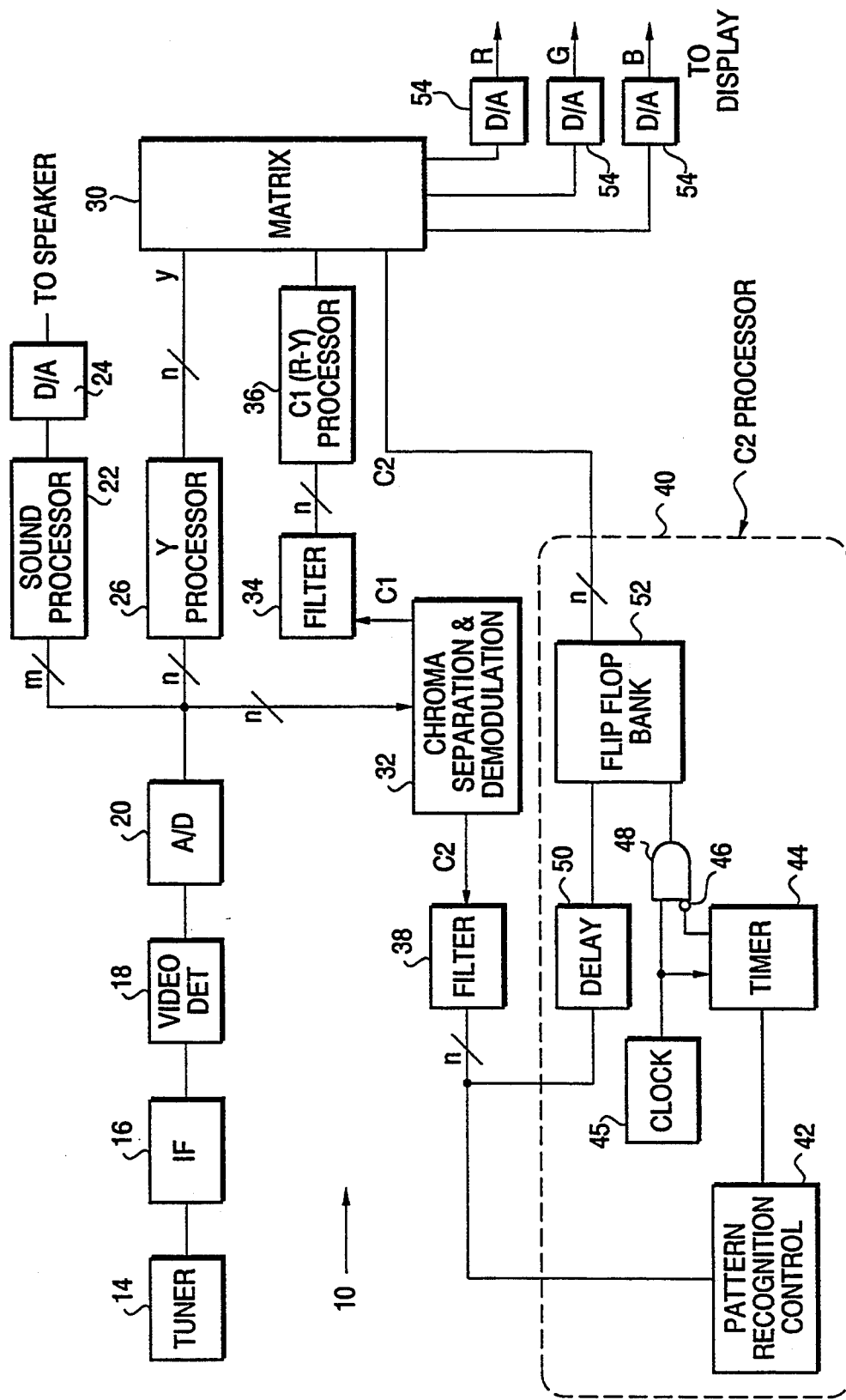
FIG. 1 is a block diagram of a color television receiver embodying the present invention.

FIG. 1 is a block diagram illustrating a color television receiver 10 embodying the circuit and method of the present invention. The tuner 14, IF 16, and video detector 18 receive the incoming color signal and process it in a conventional manner. An A/D (analog-to-digital) converter 20 at the output of the video detector 18 converts the signal into digital form.

The sound processor 22 may be implemented in any conventional manner. In the disclosed embodiment, sound is converted to digital, processed in the digital domain, and then converted back to analog by a D/A (digital-to-analog) converter 24 and fed to a speaker system. Alternatively, the A/D and D/A converters 20, 24 could be eliminated, and the sound processing could take place exclusively in the analog domain.

Similarly, the luminance processor 26 may be implemented in any conventional manner. However, because the luminance signal is used to transform (dematrix) the transmitted signal into its red, green, and blue component signals, both the luminance and the chrominance signals must be in the same domain, either analog or digital. Accordingly, because the chrominance signal in the present invention is preferably processed in the digital domain, the luminance signal should also be processed in the digital domain.

Turning now the chrominance signals, the chroma separation and demodulation circuit 32 produce two color signals C1, C2 corresponding to the R-Y and B-Y signals. Each of these signals, C1 and C2, is first passed through one of two filters, 34 or 38. The filters 34, 38 have well known bandwidth and filter characteristics (amplitude and phase response) which uniquely define their impulse and step response. The bandwidth of each filter 34, 38 is slightly narrower than the rest of the chrominance system, and thus filter bandwidth is used to control the transient response of the system.

Figure 2:
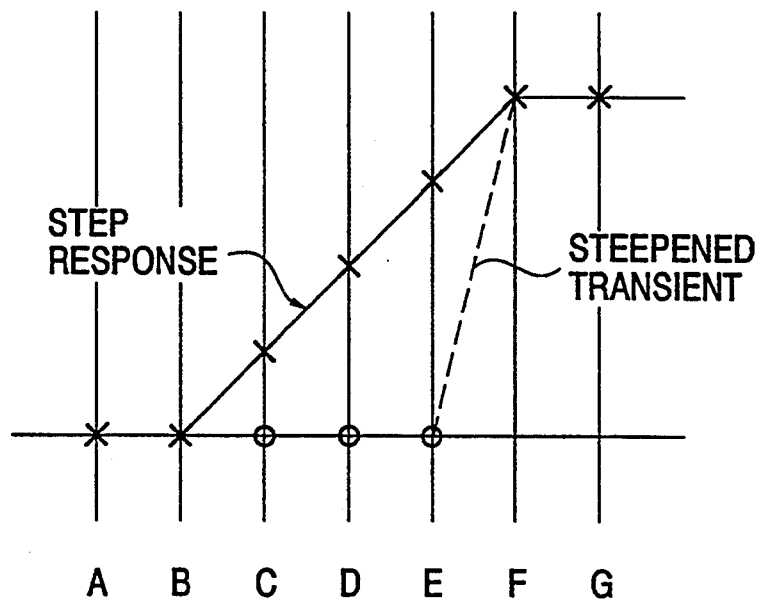
FIG. 2 is a graph illustrating one embodiment of a pattern recognition technique utilized in the present invention.
Figure 3:
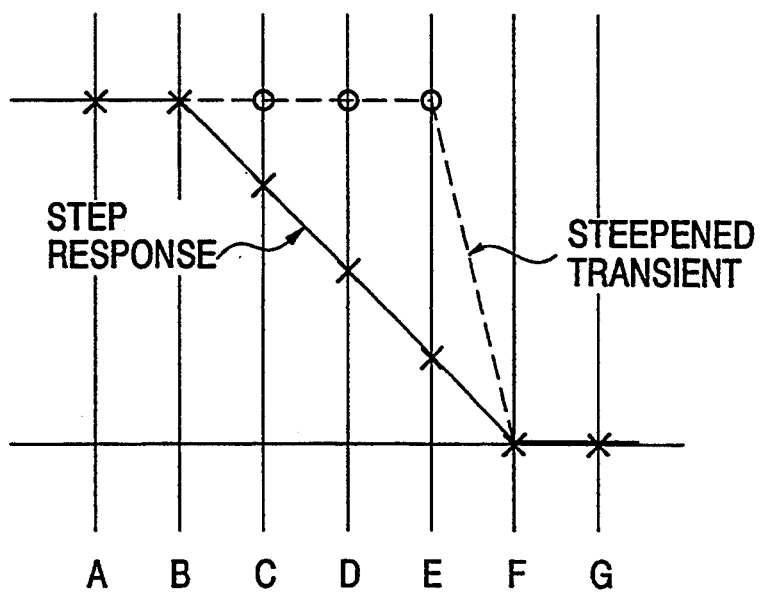
FIG. 3 is another graph illustrating the pattern recognition technique shown in FIG. 2.

When a color signal rise or fall time is faster than the filters 34, 38 allow, each filter's step response (or a close approximation thereof with the rise or fall times being controlled by the filter bandwidth and shape) is produced at the filter's output. This step response is a well known shape. An example of an ideal step response is illustrated in FIGS. 2 and 3. The sample points A through G illustrate the individual pixels as controlled by the clock 45 shown in FIG. 1. The vertical height of the waveform at a given instant is controlled by the bits that represent the amplitude of the corresponding analog signal after A/D conversion.

As shown in FIG. 1, the pattern recognition & control circuit 42 recognizes the step response of the filter 38 and activates a timer 44 to disable the clock 45 into a clocked flip flop circuit 52. When this occurs, the flip flop circuit 52 provides the same output to a matrix 30 that had existed before the clock 45 was disabled. The effect is that of a hold circuit that repeats the same output until the clock is restored. For simplicity, the flip flop circuit 52 is preferably an RS, although JK or similar such circuits are also acceptable.

The effect of the above-described circuitry on chroma transients is illustrated in FIGS. 2 and 3, where the waveform with x-marks illustrate the original chroma signal, and the waveform with o-marks illustrate the modification produced by the disclosed circuitry and method. A delay circuit 50 at the input to the flip flop circuit 52 is used to insure that the timing of the holding action occurs at the correct position in FIGS. 2 and 3. The timer 44 in the disclosed embodiment has a delay of three clock intervals which correspond to the same points shown in FIGS. 2 and 3. However, the clock interval may be varied from system to system depending on the exact clock frequency and filter characteristics used.

Figure 4:
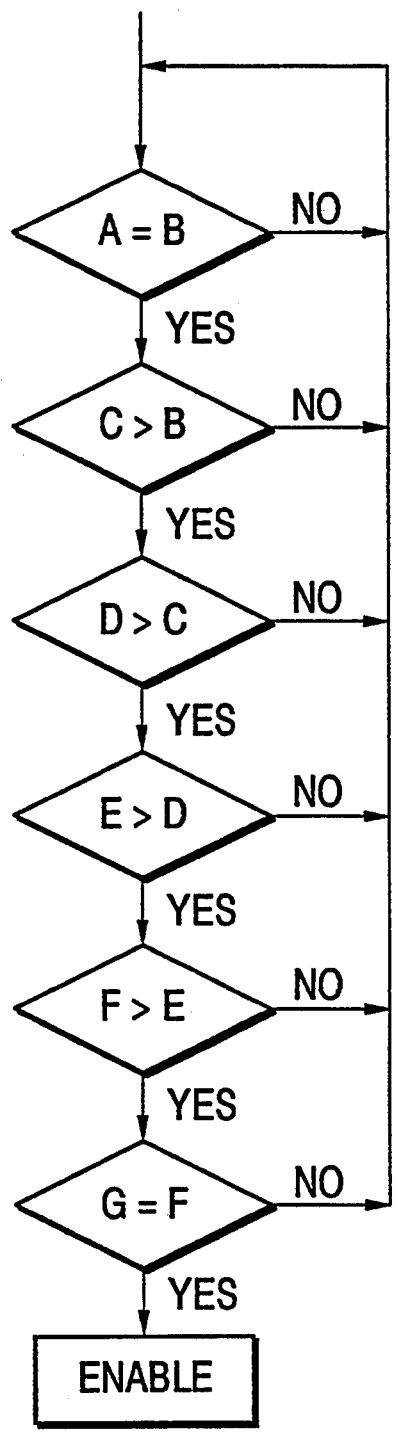
FIG. 4 is a flow chart illustrating the pattern recognition technique shown in FIG. 2.
Figure 5:
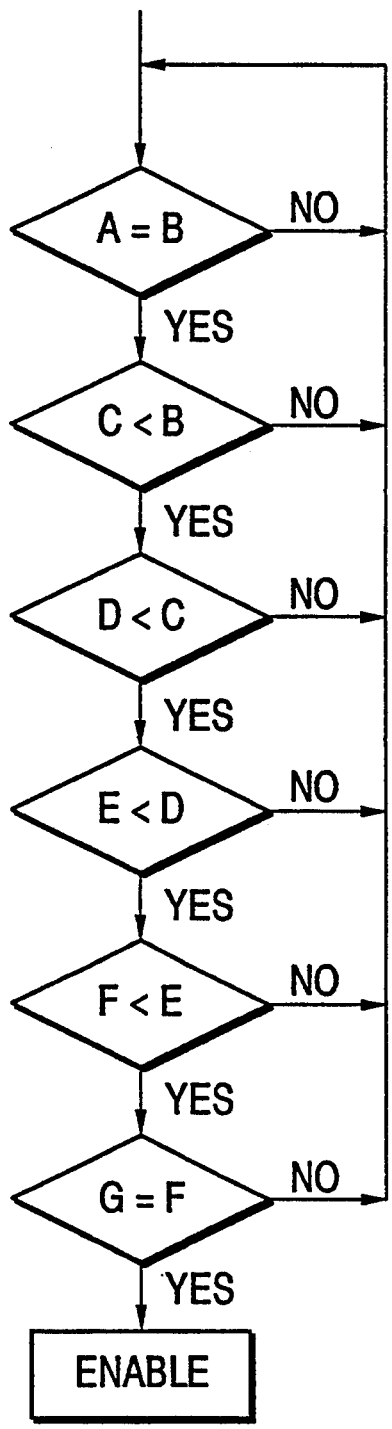
FIG. 5 is another flow chart illustrating the pattern recognition technique shown in FIG. 3.

The pattern recognition & control circuit 42 can be implemented by dedicated logic or a general purpose digital signal processing (DSP) IC. The pattern recognition protocols used in the present invention are illustrated by the flow charts shown in FIGS. 4 and 5. FIG. 4 illustrates a rising edge transient, and FIG. 5 illustrates a falling edge transient.

Turning now to the details of the disclosed embodiment, FIG. 1 is a block diagram illustrating a color television receiver 10 embodying the circuit and method of the present invention. The tuner 14, IF 16, and video detector 18 receive the incoming signal and process it in a conventional manner. An A/D converter 20 at the output of the video detector 18 converts the incoming signal into a digital chrominance signal.

The digital chrominance signal branches into two signal paths. The first path processes the C1 chrominance signal, and the second path processes the C2 chrominance signal. Essentially, the processing steps for each path is the same, and thus FIG. 1 illustrates only the details of the C2 path. It should be understood that these details, and the accompanying description herein, apply equally to both paths. Thus, the filter 34 and C1 processor 36 correspond to the filter 38 and C2 processor 40.

The digital chrominance signal is fed to the chroma separation and demodulation circuit 32 for separation of the C1 and C2 signals. These signals, C1 and C2, are used to extract the red, green and blue chrominance.

The C2 signal is fed to a filter 38, and the output of the filter 38 is fed through a delay circuit 50 to one input of a flip flop circuit 52. The filter 38 output is also fed through a pattern recognition & control circuit 42. The output of the pattern recognition & control circuit 42 is fed to a timer circuit 44, and the output of the timer 44 is fed through an inverter 46 to one input of an AND gate 48. The output of the AND gate 48 is fed to another input of the flip flop circuit 52. A clock pulse is provided directly to the timer 44. The clock pulse is also provided to the flip flop circuit 52 through the AND gate 48.

The output of the flip flop circuit 52 is the output of the C2 processor 40. The outputs of the C2 processor 40, the C1 processor 36 and the luminance processor 26 are all fed to a matrix circuit 30 to dematrix the transmitted signals into their original color components. These signals were processed in the digital domain, and thus they must be transformed by D/A converters 54 back into the analog domain. The output of these D/A converters 54 are the red, green, and blue components of the originally transmitted color signal.

When C2 has a transition time (rise or fall) greater than a predetermined amount as determined by the filter 38 characteristics, C2 is passed through the filter 38 without modification. Preferably, the filter characteristic that determines this predetermined amount is the filter's bandwidth. The delay circuit 50 delays C2 for a predetermined time and then feeds it to the flip flop circuit 52, which then passes it to the matrix circuit 30. The pattern recognition & control circuit 42 does not recognize this C2 signal, and thus, under these conditions, the circuit 42 does not affect the flip flop circuit 52. In particular, under these conditions, the pattern recognition & control circuit 42 does not enable the timer 44. Thus, the timer output to the inverter 46 is zero, and the AND gate 48 passes the clock signal to the flip flop circuit 52.

When C2 has a transition time (rise or fall) that is less than the predetermined amount as determined by the filter 38 characteristics, the filter 38 detects this by outputting its step response. This step response is delayed at the delay circuit 50 before being fed into the flip flop circuit 52. During this delay time, the pattern recognition & control circuit 42 analyzes the output from the filter 34 and determines that the filter 34 is outputting its step response. FIGS. 2 and 3 illustrate an ideal step responses detected by the pattern & control circuit 42 (rising edge and falling edge, respectively). The step response waveforms are illustrated by the x-marks. Also, FIGS. 4 and 5 illustrate the analysis protocol that is implemented by the pattern recognition & control circuit 42 in order to recognize the filter's step response. The protocols in FIGS. 4 and 5 may also be implemented by a pattern recognition & control program.

As seen in FIGS. 2 and 3, the filter step response has a flat portion, a sloping portion, and another flat portion that occurs at a fairly predictable time after the sloping portion. In particular, for the rising edge step response shown in FIG. 2, if A is approximately equal to B, C is greater than B, D is greater than C, E is greater than D, F is greater than E, and G is approximately equal to F, then the pattern recognition & control circuit 42 identifies the signal as the step response of the filter 38 and enables the timer circuit 44. The timer circuit 44 disables the clock signal into the flip flop circuit 52, thus forcing the flip flop circuit 52 to maintain its previous output. This previous output is the delayed C2 signal from prior to the occurrence of the step response (A to B in FIG. 2).

For the falling edge step response shown in FIG. 3, if A is approximately equal to B, C is less than B, D is less than C, E is less than D, F is less than E, and G is approximately equal to F, then the pattern recognition & control circuit 42 identifies the signal as the step response of the filter 38 and enables the timer circuit 44. The timer circuit 44 disables the clock signal into flip flop circuit 52, thus forcing the flip flop circuit 52 to maintain its previous output. This previous output is the delayed C2 signal from prior to the occurrence of the step response (A to B in FIG. 3).

As shown in FIGS. 2 and 3, by enabling the timer circuit 44, the pattern recognition & control circuit 42 forces the output from the flip flop circuit 52 to remain at a constant level, thereby forcing the output from the RS flip flop circuit 52 to have a substantially steeper response time. This modified signal is illustrated by the series of o-marks shown in FIGS. 2 and 3.

The pattern recognition & control circuit 42 and method (FIGS. 4 and 5) may include circuitry for calculating percentage ranges within which the sample points must fall in order for the circuit to recognize the step response of the filter 34. Thus, sample point A could be required to be within 10% of sample point B in order for the pattern recognition and control circuit 42 and method to decide that A is approximately equal to B. Also, the greater than or less than decisions could be made within a specified range such as plus or minus 10%. Alternatively, the pattern recognition & control circuit 42 could provide purely digital tolerances that examine the least significant bit of the digital words being compared. The purely digital approach is simpler than providing percentage tolerances, but may also be less accurate than the percentages.

The number of sample points, A through G, described and illustrated herein are the preferred number. However, the pattern recognition and control circuit 42 and method could be implemented with more or less sample points. In order to detect a transition, there should be at least 4 sample points.

Thus, it can be seen from the above detailed description that the present invention achieves several advantages. In particular, the circuit and method of the present invention provides a chroma transient correction scheme that is reliable, efficient, versatile, and effective on both high and low level color signals. Additionally, the present invention provides a simple, easily implemented, cost effective and economical digital circuit and method for providing direct positive control over the rise and fall time of chroma transients.

It is therefore intended that the foregoing detailed description be regarded as illustrative rather than limiting, and that it be understood that it is the following claims, including all equivalents, which are intended to define the scope of the invention.

We claim:

1. A circuit for controlling transitions in chrominance signals received by a color television receiver, the circuit comprising:
   a first circuit for receiving a digital chrominance signal and generating a first control signal in response to a first predetermined transition in said digital chrominance signal; and
   a pattern recognition circuit coupled to said first circuit for receiving and recognizing said first control signal and outputting a second control signal to a hold circuit;
   said pattern recognition circuit recognizing said first control signal by comparing one sample point on said first control signal to a previous sample point on said first control signal;
   said second control signal causing said hold circuit to generate a second predetermined transition.

2. The invention of claim 1 wherein said first circuit comprises a filter circuit.

3. The invention of claim 1 wherein said first control signal comprises a step response.

4. The invention of claim 1 wherein said first predetermined transition comprises a range of values.

5. The invention of claim 1 wherein said pattern recognition circuit outputs said second control signal when said pattern recognition circuit recognizes said first control signal.

6. The invention of claim 1 wherein:
   said first predetermined transition comprises a first predetermined transition time;
   said second predetermined transition comprises a second predetermined transition time; and
   said second predetermined transition time is less than said first predetermined transition time.

7. The invention of claim 1 wherein:
   said first circuit outputs said digital chrominance signal until said first circuit receives said first predetermined transition; and
   said hold circuit comprises:
   a delay circuit coupled to said first circuit; and
   a flip flop circuit coupled to said delay circuit and said pattern recognition circuit.

8. The invention of claim 7 wherein said second control signal disables said flip flop circuit for a predetermined time, thereby holding an output of said flip flop circuit.

9. A circuit for controlling transitions in chrominance signals received by a color television receiver, the circuit comprising:
   means for receiving a digital chrominance signal and generating a first control signal in response to a first predetermined transition in said digital chrominance signal; and
   pattern recognition means coupled to said means for receiving a digital chrominance signal for receiving and recognizing said first control signal and outputting a second control signal to a hold means;
   said pattern recognition means recognizing said first control signal by comparing one sample point on said signal to a previous sample point on said first control signal;
   said second control signal causing said hold means to generate a second predetermined transition.

10. The invention of claim 9 wherein said means for receiving a digital chrominance signal comprises a filter circuit.

11. The invention of claim 10 wherein:
   said filter circuit outputs said digital chrominance signal until said first predetermined transition is received; and
   said hold circuit comprises:
      a delay circuit coupled to said filter circuit; and
      a flip flop circuit coupled to said delay circuit and said pattern recognition circuit.

12. The invention of claim 11 wherein said second control signal disables said flip flop circuit for a predetermined time, thereby holding an output of said flip flop circuit.

13. The invention of claim 9 wherein said first control signal comprises a step response.

14. The invention of claim 9 wherein said first predetermined transition comprises a range of values.

15. The invention of claim 9 wherein said pattern recognition means outputs said second control signal when said pattern recognition means recognizes said first control signal.

16. The invention of claim 9 wherein:
   said first predetermined transition comprises a first predetermined transition time;
   said second predetermined transition comprises a second predetermined transition time; and
   said second predetermined transition time is less than said first predetermined transition time.

17. A method of controlling transitions in chrominance signals received by a color television receiver, the steps comprising:
   generating a first control signal in response to a first predetermined transition in a digital chrominance signal;
   recognizing said first control signal and generating a second control signal in response to said first control signal;
   recognizing said first control signal by comparing one sample point on said first control signal to a previous sample point on said first control signal; and
   generating a second predetermined transition in response to said second control signal.

18. The method of claim 17 wherein said first predetermined transition comprises a range of predetermined values.

19. The method of claim 17 wherein said first predetermined transition comprises a first predetermined transition time.

20. The method of claim 17 wherein:
   a filter circuit generates said first control signal; and
   said first predetermined transition time comprises a value that exceeds a bandwidth of said filter.

21. The method of claim 20 wherein said first predetermined transition time comprises a rise time.

22. The method of claim 20 wherein said first predetermined transition time comprises a fall time.

23. The method of claim 17 wherein said second control signal is generated when said first control signal is recognized.

24. The method of claim 17 wherein:
   said first predetermined transition comprises a first predetermined transition time;
   said second predetermined transition comprises a second predetermined transition time; and
   said second predetermined transition time is less than said first predetermined transition time.

25. The method of claim 17 wherein:
   said digital chrominance signal is outputted by a first circuit until said first predetermined transition is received; and
   a hold circuit is provided comprising:
      a delay circuit coupled to said first circuit; and
      a flip flop circuit coupled to said delay circuit and a pattern recognition circuit.

26. The method of claim 25 wherein said second control signal disables said RS flip flop circuit for a predetermined time, thereby holding an output of said flip flop circuit.

27. A circuit for controlling transistors in chrominance signals received by a color television receiver, the circuit comprising:
   a first circuit for receiving a digital chrominance signal and generating a first control signal in response predetermined transition in said digital chrominance signal; and
   a pattern recognition circuit coupled to said first circuit for receiving and recognizing said first control signal and outputting a second control signal to a hold circuit;
   said pattern recognition circuit recognizing said first control signal by dividing said control signal into sample points and comparing said sample points;
   said second control signal causing said hold circuit to generate a second predetermined transition.

28. The invention of claim 27 wherein:
   said sample points comprise at least A, B, F, and G; and
   said comparison comprises comparing B to A, F to B, and G to F.

29. The invention of claim 28 wherein said first control signal is recognized when A is approximately equal to B, and F is greater than B, and G is approximately equal to F.

30. The invention of claim 28 wherein said first control signal is recognized when A is approximately equal to B, and F is less than B, and G is approximately equal to F.

31. The invention of claim 27 wherein:
   said sample points comprise at least A, B, C, D, E, F, and G; and
   said comparison comprises comparing B to A, C to B, D to C, E to D, F to E, and G to F.

32. The invention of claim 31 wherein said first control signal is recognized when A is approximately equal to B, and C is greater than B, D is greater than C, E is greater than D, F is greater than E, and G is approximately equal to F.

33. The invention of claim 31 wherein said first control signal is recognized when A is approximately equal to B, and C is less than B, D is less than C, E is less than D, F is less than E, and G is approximately equal to F.

34. A circuit for controlling transitions in chrominance signals received by a color television receiver, the circuit comprising:
   means for receiving a digital chrominance signal and generating a first control signal in response to a first predetermined transition in said digital chrominance signal; and
   pattern recognition means coupled to said means for receiving a digital chrominance signal for receiving and recognizing said first control signal and outputting a second control signal to a hold means;
   said pattern recognition means recognizing said first control signal by dividing said first control signal into sample points and comparing said sample points;
   said second control signal causing said hold means to generate a second predetermined transition.

35. A method of controlling transitions in chrominance signals received by a color television receiver, the steps comprising:
   generating a first control signal in response to a first predetermined transition in a digital chrominance signal;
   recognizing said first control signal and generating a second control signal in response to said first control signal;
   generating a second predetermined transition in response to said second control signal;
   recognizing said first control signal by dividing said control signal into sample points and comparing said sample points.

36. The method of claim 35 wherein:
   said sample points comprise at least A, B, F, and G; and
   said comparison comprises comparing B to A, F to B, and G to F.

37. The invention of claim 36 wherein said first control signal is recognized when A is approximately equal to B, and F is greater than B, and G is approximately equal to F.

38. The invention of claim 36 wherein said first control signal is recognized when A is approximately equal to B, and F is less than B, and G is approximately equal to F.

39. The invention of claim 35 wherein:
   said sample points comprise at least A, B, C, D, E, F, and G; and
   said comparison comprises comparing B to A, C to B, D to C, E to D, F to E, and G to F.

40. The invention of claim 39 wherein said first control signal is recognized when A is approximately equal to B, and C is greater than B, D is greater than C, E is greater than D, F is greater than E, and G is approximately equal to F.

41. The invention of claim 39 wherein said first control signal is recognized when A is approximately equal to B, and C is less than B, D is less than C, E is less than D, F is less than E, and G is approximately equal to F.

42. A circuit for controlling transitions in chrominance signals received by a color television receiver, the circuit comprising:
   a pattern recognition circuit for receiving a first predetermined transition in a digital chrominance signal and outputting a control signal to a hold circuit;
   said pattern recognition circuit recognizing said first predetermined transition in said chrominance signal by dividing said digital chrominance signal into sample points and comparing said sample points; and
   said control signal causing said hold circuit to generate a second predetermined transition.

43. A circuit for controlling transitions in chrominance signals received by a color television receiver, the circuit comprising:
   a first circuit for receiving a digital chrominance signal and generating a first control signal in response to a first predetermined transition in said digital chrominance signal;
   a pattern recognition circuit coupled to said first circuit for receiving and recognizing said first control signal and outputting a second control signal to a hold circuit;
   said second control signal causing said hold circuit to generate a second predetermined transition;
   said first circuit comprising a filter circuit; and
   said first predetermined transition comprising a time value that exceeds a response capability of said filter.

44. The invention of claim 43 wherein said first predetermined transition time comprises a range of values.

45. The invention of claim 43 wherein said first predetermined transition time comprises a predetermined rise time.

46. The invention of claim 43 wherein said first predetermined transition time comprises a predetermined fall time.

47. A circuit for controlling transitions in chrominance signals received by a color television receiver, the circuit comprising:
   means for receiving a digital chrominance signal and generating a first control signal in response to a first predetermined transition in said digital chrominance signal;
   pattern recognition means coupled to said means for receiving a digital chrominance signal for receiving and recognizing said first control signal and outputting a second control signal to a hold means;
   said second control signal causing said hold means to generate a second predetermined transition
   said means for receiving a digital chrominance signal comprising a filter circuit; and
   said first predetermined transition comprising a time value that exceeds a response capability of said filter circuit.

48. The invention of claim 47 wherein said first predetermined transition time comprises a range of values.

49. A circuit for controlling transitions in chrominance signals received by a color television receiver, the circuit comprising:
   a pattern recognition circuit for receiving a first predetermined transition in a digital chrominance signal and outputting a control signal to a hold circuit;
   said pattern recognition circuit recognizing said first predetermined transition in said chrominance signal by comparing one sample point on said chrominance signal to a previous sample point on said chrominance signal; and
   said control signal causing said hold circuit to generate a second predetermined transition.

* * * * *

UNITED STATES PATENT AND TRADEMARK OFFICE
CERTIFICATE OF CORRECTION

PATENT NO. : 5,374,964
DATED : December 20, 1994
INVENTOR(S) : Theodore S. Rzeszewski It is certified that error appears in the above-identified patent and that said Letters Patent is hereby corrected as shown below:

Col. 9, line 16, before "signal", insert --first control--.
Col. 10, line 40, before "predetermined", insert --to a first--.

Signed and Sealed this

Twenty-eighth Day of November 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,374,964
DATED : December 20, 1994
INVENTOR(S) : Theodore S. Rzeszewski It is certified that error appears in the above-indentified patent and that said Letters Patent is hereby corrected as shown below:

In the Claims

Col. 10, line 34,
In claim 27, line 1, delete "transistors" and substitute --transitions--.

Signed and Sealed this

Twenty-third Day of July, 1996

Attest:

BRUCE LEHMAN

Attesting Officer     Commissioner of Patents and Trademarks